United States Patent [19]

Satou

[11] Patent Number: 5,426,357
[45] Date of Patent: Jun. 20, 1995

[54] CONTROL DEVICE FOR INDUCTION MOTOR

[76] Inventor: Nobuyasu Satou, 11-3-501, Minamifujisawa, Fujisawa-shi, Kanagawa-ken, Japan

[21] Appl. No.: 66,270

[22] Filed: May 25, 1993

[51] Int. Cl.$^6$ ............................................. H02P 7/622
[52] U.S. Cl. ........................................ 318/811; 318/801; 318/727
[58] Field of Search ............. 318/727, 765, 766, 772, 318/778, 798–807, 810, 811, 812

[56] References Cited

U.S. PATENT DOCUMENTS

| | | | |
|---|---|---|---|
| 3,925,640 | 12/1975 | Duggan | 235/150.1 |
| 4,197,577 | 4/1980 | Johnson et al. | 364/118 |
| 4,881,160 | 11/1989 | Sakai et al. | 364/161 |
| 4,903,192 | 2/1990 | Saito et al. | 364/157 |
| 4,926,105 | 5/1990 | Mischenko et al. | 318/800 |
| 4,951,191 | 8/1990 | Hiroi et al. | 364/165 |
| 5,057,993 | 10/1991 | Kanda . | |
| 5,091,844 | 2/1992 | Waltz | 364/153 |
| 5,119,287 | 6/1992 | Nakamura et al. | 364/148 |
| 5,122,963 | 6/1992 | Chen | 364/471 |
| 5,126,933 | 6/1992 | White, III | 364/148 |
| 5,153,807 | 10/1992 | Saito et al. | 364/165 |
| 5,175,678 | 12/1992 | Frerichs et al. | 364/148 |
| 5,195,028 | 3/1993 | Hiroi | 364/161 |
| 5,291,390 | 3/1994 | Satou | 364/148 |
| 5,325,288 | 6/1994 | Satou | 364/126 |

FOREIGN PATENT DOCUMENTS 59-90103  5/1985  Japan ................................. 364/148

OTHER PUBLICATIONS

ISA Transactions, vol. 16, No. 4, 1977, Pittsburgh, U.S., pp. 59–67, D. Etchard: *Forecasting and Compensating the Effects of Deadtime on a Commonly Applied Chemical Pacing Control Loop.*

Automatisierungstechnik–AT, vol. 35, No. 11, 1987, Muenchen, DE, pp. 464–465, A. Glattfelder et al.: *Zum Fuehrungsverhalten von PID-ARW-Eingroessenkreisen.*

English language abstract of JP-A-59159695 (published on Sep. 10, 1984), Patent Abstracts of Japan, vol. 9, No. 10 (E-290), Jan. 17, 1985.

Gastli, Adel et al., "V/f PWM Inverter with Motor Parameter Identification and Voltage Auto-Boost Capabilities", IECON'90, 16th Annual Conference of IEEE Industrial Electronics Society, vol. II, Nov. 27–30, 1990, pp. 903–908.

*Primary Examiner*—Bentsu Ro
*Attorney, Agent, or Firm*—Kenyon & Kenyon

[57] ABSTRACT

In an induction motor controlling device for controlling a primary voltage $V_{1(n)}$ at discrete timings, a primary current $I_{1(n)}$ is detected and the following torque factor parameter $u_{(n)}$ is derived:

$$u_{(n)} = \{R_1 x_{m(n)} + \sqrt{(R_1 x_{m(n)}^2 + D_{1(n)} \cdot D_{2(n)})}\}/D_{1(n)}$$

where $$D_{1(n)} = (V_{1(n)}/I_{1(n)})^2 - (R_1^2 + x_{1(n)}^2)$$

$$D_{2(n)} = R_1^2 + (x_{1(n)} + x_{m(n)})^2 - (V_{1(n)}/I_{1(n)})^2$$

$R_1$: the resistance of a primary winding,
$x_1$: primary leakage reactance,
$x_m$: exciting reactance.

Then, the magnitude $C_{(n)}$ of the present excitation current and a target value $u^*_{(n)}$ of the torque factor parameter which gives a maximum efficiency are derived according to the following equations, $$C_{(n)} = |I_{1(n)}|/\sqrt{1 + u_{(n)}^2} \;;$$

$$u_{(n)}^* = R_1 x_{m(n)}/\left(\sqrt{R_1(R_1 + R_{21})x_{m(n)}^2 + (R_1 R_{21})^2} + R_1 R_{21}\right),$$

where $R_{21}$: the resistance of a secondary winding.

The magnitude $C_{(n+1)}$ of an excitation current in the next cycle is derived based on the following equation, $$C_{(n+1)} = C_{(n)} \sqrt{u_{(n)}/u_{(n)}^*} \;.$$

8 Claims, 4 Drawing Sheets

CONTROL DEVICE FOR INDUCTION MOTOR

BACKGROUND OF THE INVENTION

1. Field of the Invention

The present invention relates to a control device for an induction motor, and more particularly to a control device for coping with a variation in the load by changing the rotation speed according to a variation in the torque of the load.

2. Description of the Related Art

The conventional induction motor uses a VVVF (variable voltage and variable frequency) type voltage inverter in which both of the voltage and frequency can be varied. When the torque of the load varies, the rotation speed is changed. In this case, since the magnetic flux in the motor varies in proportion to the voltage/frequency ratio, a voltage is lowered to keep the ratio V/f of the output voltage v to the frequency f at a constant value when the frequency is lowered to lower the rotation speed of the motor. The V/f ratio represents a frequency-voltage characteristic of the motor, the conventional inverter contains a plurality of V/f characteristic patterns, and the user selects one of the V/f characteristic patterns according to the type of the load, motor and the circumstance by trial-and-error.

However, it is difficult to determine a V/f pattern which is suitable for a system in which the load varies, and in practice, an excessively large V/f ratio must be selected and it is not satisfactory from the viewpoint of energy saving. That is, since the V/f ratio is not changed according to a variation in the motor load, the slippage s of the motor becomes excessively small when the load is small, and in contrast, the slippage s becomes excessively large when the load is large, thereby lowering the motor efficiency.

Thus, in the conventional induction motor controlling device, since the voltage V is not controlled according to the load torque, the slippage is deviated from a desired value by a variation in the load torque, thereby lowering the efficiency.

SUMMARY OF THE INVENTION

The present invention has been made in view of the above problem, and an object of the present invention is to provide an induction motor controlling device which can keep the motor efficiency constant irrespective of a variation in the load and drive the induction motor with high efficiency.

The above object can be attained by an induction motor controlling device comprising:

means for applying a preset primary voltage $V_{1(n)}$ to an induction motor;

means for detecting a primary current $I_{1(n)}$ of the induction motor;

means for deriving a torque factor parameter $u_{(n)}$ expressed by the following equation, $$u_{(n)} = \{R_1 x_{m(n)} + \sqrt{(R_1 x_{m(n)}^2 + D_{1(n)} \cdot D_{2(n)}\}/D_{1(n)}}$$

where $$D_{1(n)} = (V_{1(n)}/I_{1(n)})^2 - (R_1^2 + x_{1(n)}^2)$$

$$D_{2(n)} = R_1^2 + (x_{1(n)} + x_{m(n)})^2 - (V_{1(n)}/I_{1(n)})^2$$

$R_1$: the resistance of a primary winding, $x_1$: primary leakage reactance ($x_1 = \omega l_{11}$, and $l_{11}$ is primary leakage equivalent inductance), $x_m$: exciting reactance ($x_m = \omega l_{m1}$, and $l_{m1}$ is exciting leakage equivalent inductance), and $\omega$: angular frequency;

means for deriving the magnitude $C_{(n)}$ of an excitation current expressed by the following equation, $$C_{(n)} = |I_{1(n)}|/\sqrt{1 + u_{(n)}^2} \; ;$$

means for deriving a target value $u^*_{(n)}$ of the torque factor pattern expressed by the following equation, $$u_{(n)}^* = R_1 x_{m(n)}/\left(\sqrt{R_1(R_1 + R_{21})x_{m(n)}^2 + (R_1 R_{21})^2} + R_1 R_{21}\right),$$

where $R_{21}$: the resistance of a secondary winding;

means for deriving the magnitude $C_{(n+1)}$ of an excitation current in the next cycle which maximizes the motor efficiency and is expressed by the following equation, $$C_{(n+1)} = C_{(n)} \sqrt{u_{(n)}/u_{(n)}^*} \; ; \text{ and}$$

means for controlling the primary voltage to attain said excitation current $C_{(n+1)}$ according to the following equation, $$|V_{1(n+1)}| = C_{(n+1)} \sqrt{A(u^*)^2 + B(u^*)^2}$$

where $$A(u^*) = R_1 - X_1 u^*,$$

and $$B(u^*) = R_1 u^* + (x_1 + x_m).$$

According to the induction motor controlling device of the present invention, a torque corresponding to a desired load torque is generated and the load torque follow-up control of energy saving for keeping the motor efficiency maximum can be effected under this condition by detecting the load torque, deriving an excitation current which causes an optimum motor efficiency for the load torque and outputting a voltage for causing the excitation current.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

There will now be described an embodiment of an induction motor controlling device according to the present invention with reference to the accompanying drawings.

Figure 1:
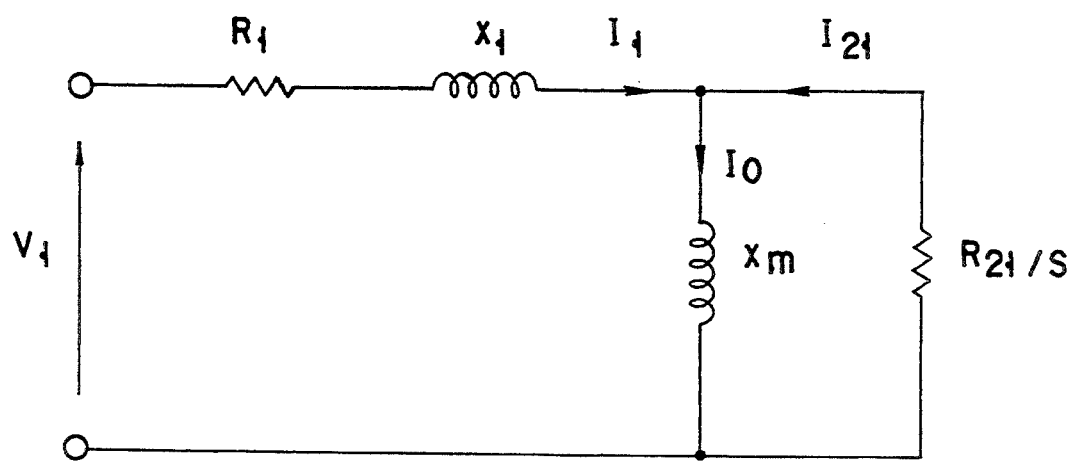
FIG. 1 is an equivalent circuit diagram showing an induction motor for illustrating the principle of an induction motor controlling device according to the present invention.

FIG. 1 shows an equivalent circuit (T-I type equivalent circuit with the iron loss therein neglected) of one phase of an induction motor in the steady state for illustrating the principle of a first embodiment. The parameters are defined as follows. FIG. 1 is a vectorially represented equivalent circuit diagram.

$V_1$: phase-to-phase voltage vector;
$I_1$: primary current vector;
$I_{21}$: secondary current vector;
$I_o$: excitation current vector;
$R_1$: primary winding resistance;
$R_{21}$: secondary winding resistance;
$x_1$: primary leakage reactance ($x_1 = \omega l_{11}$ and $l_{11}$ is primary leakage equivalent inductance);
$x_m$: exciting reactance ($x_m = \omega l_{m1}$ and $l_{m1}$ is exiting equivalent inductance);
s: slippage; and
$\omega$: primary angular frequency ($\omega = 2\pi f$ [rad/sec]).

The following equations (1) to (3) can be obtained from FIG. 1.

$$V_1 = (R_1 + jx_1)I_1 + jx_m I_o \qquad (1)$$

$$jx_m I_o + (R_{21}/s)I_{21} = 0 \qquad (2)$$

$$I_o = I_1 + I_{21} \qquad (3)$$

In the present invention, in order to derive the condition for permitting the induction motor to be always driven with the maximum efficiency irrespective of a variation in the load torque based on the equations (1) to (3), a torque factor parameter u and functions A(u) and B(u) of the parameter u are defined as expressed by the following equations (4) to (6).

$$u = sx_m/R_{21} \qquad (4)$$

$$A(u) = R_1 - x_1 u \qquad (5)$$

$$B(u) = R_1 u + (x_1 + x_m) \qquad (6)$$

The following equations (7) and (8) can be obtained by rewriting the equations (1) to (3) by use of the equations (4) to (6).

$$|V_1| = |I_o|\sqrt{A(u)^2 + B(u)^2} \; [V] \qquad (7)$$

$$|I_1| = |I_o|\sqrt{1 + u^2} \; [A] \qquad (8)$$

The total output torque $Tq_m$ of the motor can be expressed by the following equation (9) when the number of poles of the motor is P.

$$Tq_m = 3P l_{m1} |I_o|^2 u/2 \; [N\cdot m] \qquad (9)$$

Further, the total output power $P_o$, generation heat loss $W_H$, power consumption $E_i$ and motor efficiency $\eta_m$ of the motor are expressed by the following equations (10) to (13).

$$P_o = 3|I_o|^2(x_m - R_{21}u)u \; [W] \qquad (10)$$

$$W_H = 3|I_o|^2\{(1+u^2)R_1 + R_{21}u^2\} \; [W] \qquad (11)$$

$$E_i = P_o + W_H \; [W] \qquad (12)$$

$$\begin{aligned}\eta_m &= \eta m(u) \\ &= P_o/E_i \\ &= 1/(1 + W_H/P_o) \\ &= 1/(1 + g(u))\end{aligned} \qquad (13)$$

It is understood from the equation (13) that the efficiency $\eta_m$ can be expressed as a function of the torque factor parameter u. g(u) in the equation (13) is expressed by the following equation (14).

$$\begin{aligned}g(u) &= W_H/P_o \\ &= \{(R_1 + R_{21})u^2 + R_1\}/(x_m - R_{21}u)u\end{aligned} \qquad (14)$$

As a result, it is understood that g'(u) may be set to 0 in order to set the motor efficiency $\eta_m$ to a maximum value. For this reason, the value of u which causes g'(u)=0 can be obtained as the target value u* of u. u* can be derived by the following equation (15).

$$u^* = R_1 x_m \left(\sqrt{R_1(R_1 + R_{21})x_m^2 + (R_1 R_{21})^2} + R_1 R_{21}\right) \qquad (15)$$

When u=u*, the efficiency $\eta_m(u)$ of the induction motor is set to the maximum value $\eta_m(u^*)$ expressed by the following equation (16).

$$\eta_m(u^*) = u^*/\{(2R_1/x_m) + u^*\} \qquad (16)$$

That is, the induction motor can be controlled to be always driven with the maximum efficiency irrespective of a variation in the load torque by controlling the torque factor parameter u defined in the equation (4) to be set to a value obtained in the equation (15). In this case, however, the torque factor parameter u of the equation (4) contains s and $x_m$ and cannot be derived from the equation (4) if the frequency (rotation speed) is previously known, and therefore, in the present invention, the present value of the torque factor parameter u is derived based on the equations (7) and (8) based on the assumption that the equations (7) and (8) are simultaneous equations with respect to u. Since $|V_1|$ is an output voltage of the inverter and is previously known, the present value u of the torque factor parameter can be derived by the following equations (17) to (19) by detecting a value of $|I_1|$ by use of a sensor, for example.

$$u = \{R_1 x_m + \sqrt{(R_1 x_m)^2 + D_1 D_2}\}/D_1 \quad (17)$$

$$D_1 = (V_1/I_1)^2 - (R_1^2 + x_1^2) \quad (18)$$

$$D_2 = R_1^2 + (x_1 + x_m)^2 - (V_1/I_1)^2 \quad (19)$$

That is, the excitation current $I_o$ or phase-to-phase voltage $V_1$ may be controlled to set $u^*$ (equation (15))=u (equation (17)). As a result, an induction motor controlling device capable of controlling the V/f ratio according to the load torque can be obtained.

Figure 2:
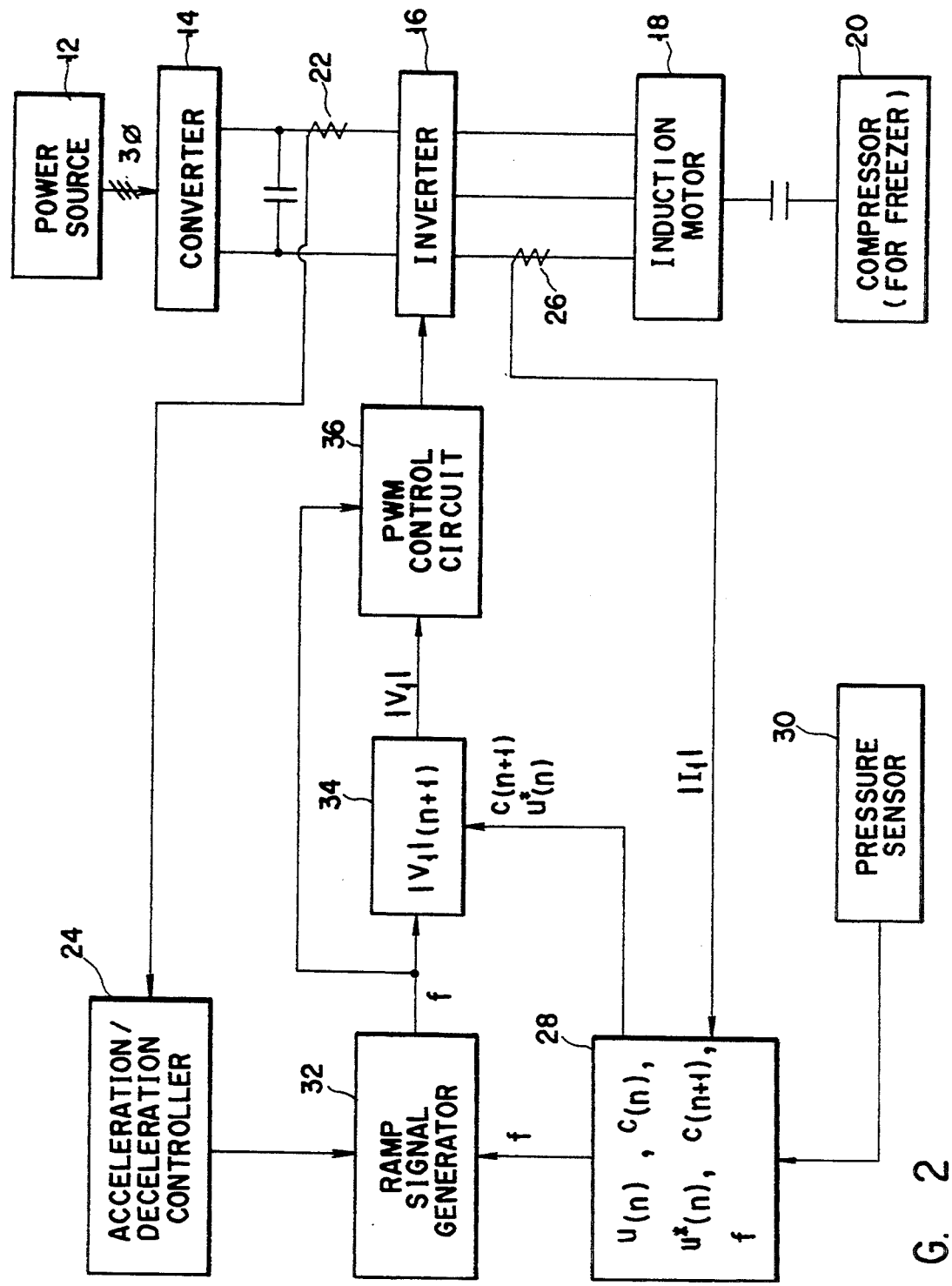
FIG. 2 is a block diagram showing an embodiment of the present invention of an induction motor controlling device.

The principle of the present invention has been described above, and the embodiment of the present invention using the above principle is explained with reference to the block diagram of FIG. 2 and the flowchart of FIG. 3. A 3-phase A.C. power source 12 is connected to a converter 14, and a D.C. voltage from the converter 14 is converted to an A.C. voltage of desired amplitude with a desired frequency by an inverter 16 and applied to an induction motor 18. A compressor 20 used for a refrigerating machine, for example, is connected to the induction motor 18 as a load. An output current of the converter 14 is detected by a current sensor (Hall element) 22 and supplied to an acceleration/deceleration controller 24. An output current (primary current of the induction motor) of the inverter 16 is detected by a current sensor 26 and supplied to an arithmetic operation circuit 28. Assuming that the sampling control is effected in the present invention and the timing is represented by n, then the arithmetic operation circuit 28 derives a torque factor parameter $u_{(n)}$, target value $u^*_{(n)}$ thereof, and excitation current values $C_{(n)}$ and $C_{(n+1)}$. Further, a pressure sensor 30 for detecting a suction pressure of the compressor to effect the frequency control is provided and an output thereof is also supplied to the arithmetic operation circuit 28. The arithmetic operation circuit 28 calculates a frequency based on the pressure. The frequency control is effected by use of a known PID control system or the like which is different from that used for controlling the excitation current, but it is not a main portion of the present invention and the detail explanation therefor is omitted.

A frequency command signal output from the arithmetic operation circuit 28 is input to a ramp signal generator 32 and a torque factor parameter $u^*_{(n)}$ and excitation current $C_{(n+1)}$ output from the arithmetic operation circuit 28 are input to a voltage calculator 34. A signal from the acceleration/deceleration controller 24 is also supplied to the ramp signal generator 32. A frequency f output from the ramp signal generator 32 is also input to the voltage calculator 34. The frequency f output from the ramp signal generator 32 and a voltage $|V_1|$ output from the voltage calculator 34 are supplied to a pulse-width modulation (PWM) controller 36. The PWM controller 36 controls an output voltage (primary voltage of the motor) of the inverter by controlling the conduction time of switching elements of the inverter 16.

Figure 3:
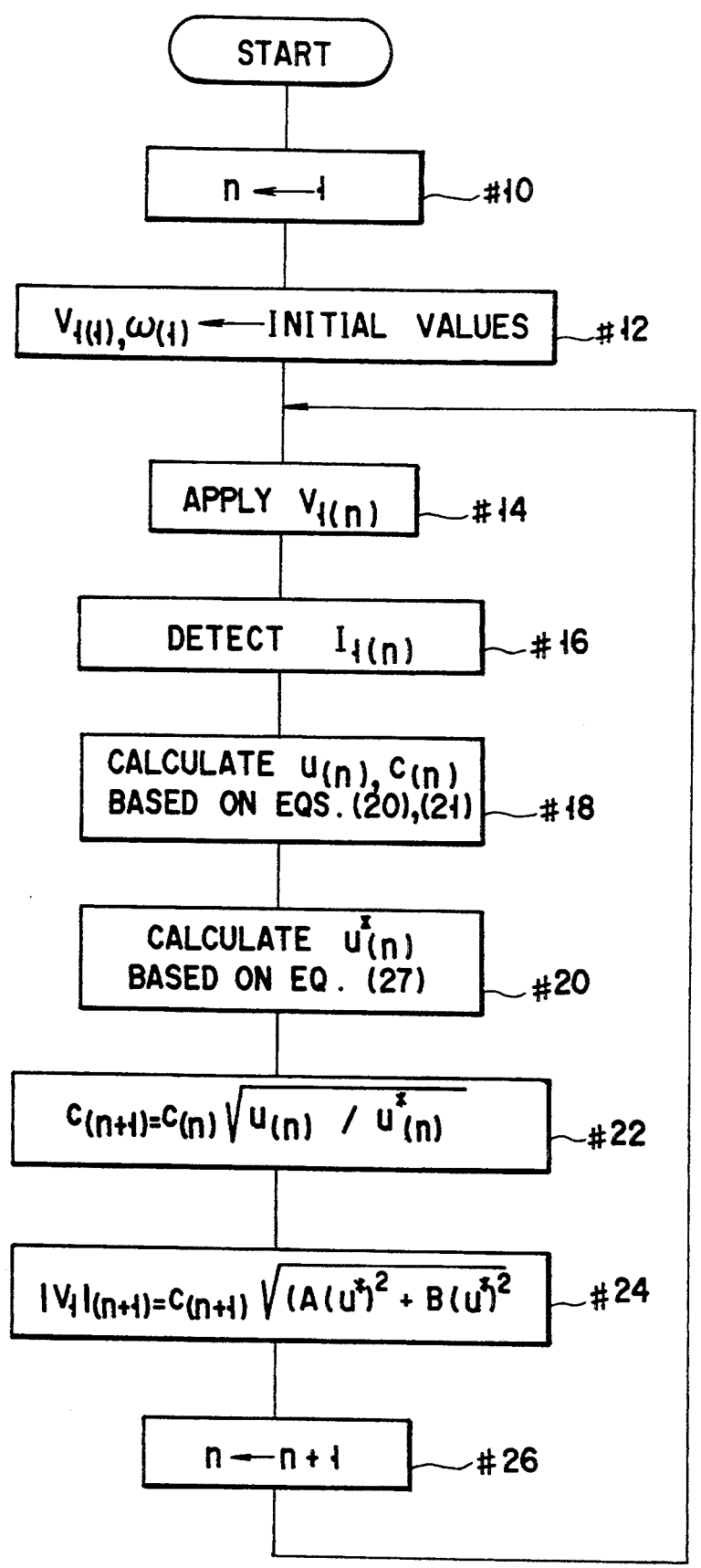
FIG. 3 is a flow chart for illustrating the operation of this embodiment.

FIG. 3 is a flowchart for illustrating the operation of the embodiment. For convenience of explanation, the magnitude $|I_o|$ of the excitation current is expressed by C. That is, $C_{(1)}$: the initial value of the excitation current, $C_{(n)}$: the present value (at the n-th timing) of the excitation current, and $C_{(n+1)}$: the excitation current to be output in the next cycle (at the (n+1)-th timing).

First, the suffix n indicating the timing is set to "1" in the step #10.

In the step #12, the initial values $V_{1(1)}$ and $\omega_{(1)}$ of the primary voltage $V_1$ and the primary frequency $\omega$ are adequately set, and in the step #14, the motor driving is started. The present invention relates to the control method for the primary voltage $V_1$ and the method for the frequency $\omega$ has no relation with $V_1$ and is effected by a different control system using the ordinary PID control, and therefore, the explanation for the control of $\omega$ is omitted.

In the step #16, the primary current $I_{1(1)}$ obtained at this time (at the timing n=1) is detected by a sensor.

In the step #18, the present value of the torque factor parameter $u_{(n)}$ and the excitation current $C_{(n)}$ are respectively derived by the following equations (20) and (21) based on the equations (17) and (8).

$$u_{(n)} = \left\{R_1 x_{m(n)} + \sqrt{(R_1 x_{m(n)}^2 + D_{1(n)} \cdot D_{2(n)}}\right\}/D_{1(n)} \quad (20)$$

$$C_{(n)} = |I_{1(n)}|/\sqrt{1 + u_{(n)}^2} \quad (21)$$

where $$D_{1(n)} = (V_{1(n)}/I_{1(n)})^2 - (R_1^2 + x_{1(n)}^2) \quad (22)$$

$$D_{2(n)} = R_1^2 + (x_{1(n)} + x_{m(n)})^2 - (V_{1(n)}/I_{1(n)})^2 \quad (23)$$

In the above example, the primary voltage $V_{1(n)}$ is a known value and is not detected, but it is possible to detect an actual voltage.

At this time, the load torque $T_{qL(n)}$ is set in balance with the motor torque expressed by the equation (9) and the following equation (24) can be obtained.

$$T_{qL(n)} = 3PI_{m1} C_{(n)}^2 u_{(n)}/2 \quad [N \cdot m] \quad (24)$$

Since the target value of u is $u^*$, an optimum excitation current $C_{(n+1)}$ to be output in the next cycle (at the timing (n+1)) to effect the control for setting the motor efficiency $\eta_m$ to a maximum value satisfies the following equation (25).

$$T_{qm(n+1)} = 3PI_{m1} C_{(n+1)}^2 u^*_{(n)}/2 = T_{qL(n)} \quad (25)$$

The optimum excitation current $C_{(n+1)}$ in the next cycle can be derived by the following equation (26) by substituting the equation (24) into the equation (25).

$$3PI_{m1} C_{(n+1)}^2 u^*_{(n)}/2 = 3PI_{m1} C_{(n)}^2 u_{(n)}/2 \quad (26)$$

$$\therefore C_{(n+1)} = C_{(n)} \sqrt{u_{(n)}/u^*_{(n)}}$$

$u^*_{(n)}$ can be derived by the following equation (27) by substituting $x_{m(n)}$ into the equation (15).

$$u^*_{(n)} = R_1 x_{m(n)} / \left( \sqrt{R_1(R_1 + R_{21})x^2_{m(n)} + (R_1R_{21})^2} + R_1R_{21} \right) \quad (27)$$

Thus, $u^*_{(n)}$ is derived based on the equation (27) in the step #20 and the excitation current $C_{(n+1)}$ is derived based on the equation (26) in the step #22.

The primary voltage $|V_1|(n+1)$ which makes it possible to derive the above excitation current $C_{(n+1)}$ can be derived from the equation (7) according to the following equation (28).

$$|V_{1(n+1)}| = C_{(n+1)}\sqrt{A(u^*)^2 + B(u^*)^2} \quad (28)$$

Therefore, the primary voltage is derived based on the equation (28) in the step #24, n is incremented by one in the step #26, and then the flow is returned to the step #14 and the motor driving is effected according to the primary voltage $V_{1(n)}$.

By effecting the above-described operations, the induction motor is driven according to the load torque with the optimum motor efficiency $\eta_{m(u^*)}$ in the permissible ranges of $|V_1|$ and $|I_1|$ of the power source (in practice, inverter 16).

Figure 4:
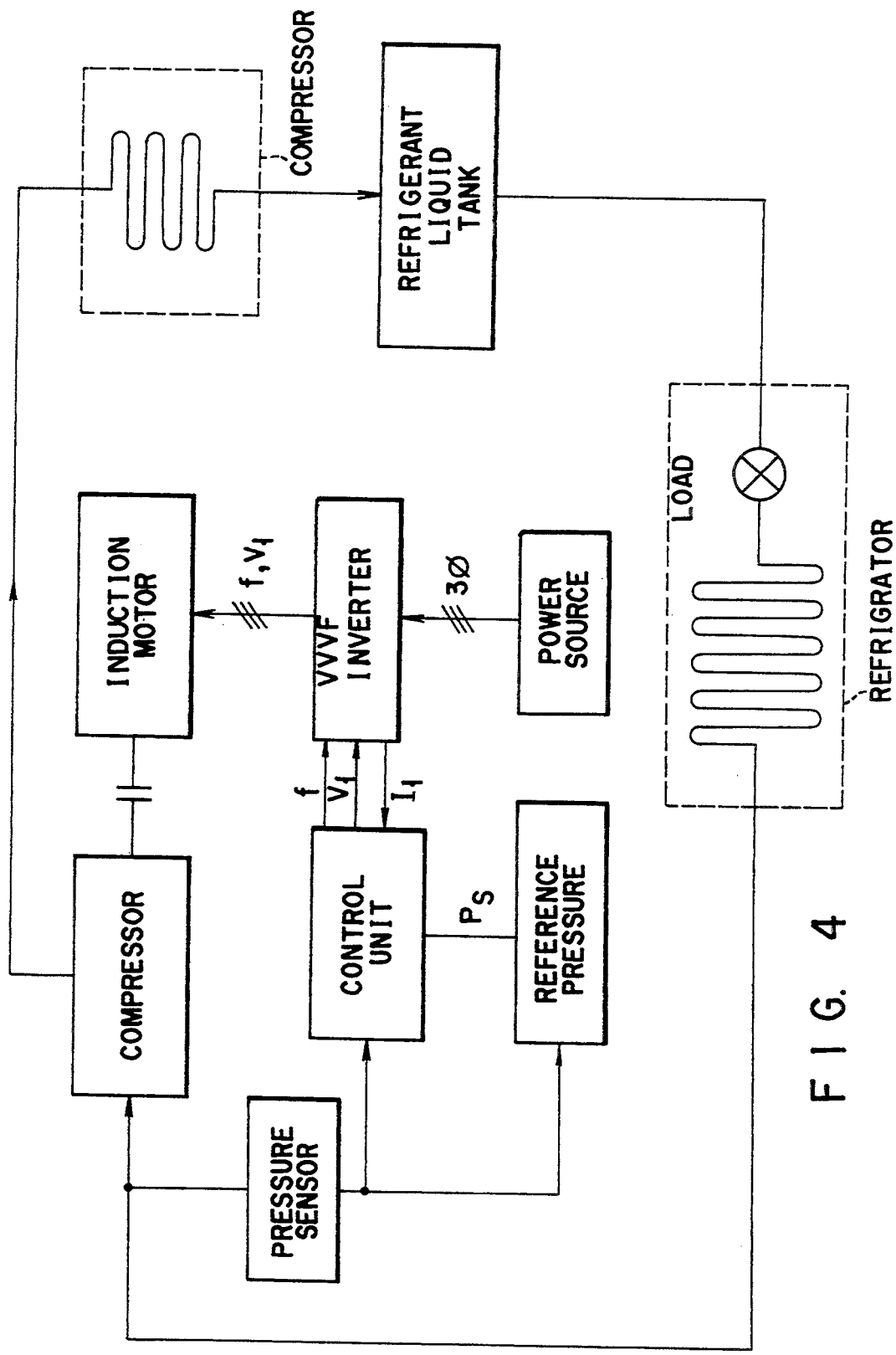
FIG. 4 is a block diagram of a refrigerating machine provided as a concrete example to which this embodiment is applied.

FIG. 4 shows a refrigerating system which is a concrete example of an industrial machine to which the present invention is applied. The concept of cycles in which the condenser pressure and refrigerator pressure are influenced by variations in the temperature of the outer atmosphere and refrigerating load as disturbances and the load torque is changed can be understood from FIG. 4. Further, a change of the target value Ps of the suction pressure will generally cause a variation in the motor efficiency.

In a case where an inverter is used for a refrigerating system as a variable power source as shown in FIG. 4, the suction (refrigerant) pressure of the refrigerator is controlled with respect to the preset value in most cases. In general, the pressure control system is to determine f by effecting the PID control or the like. In the present invention, a control system for the motor efficiency is provided separately from the above pressure control system.

In a case where the induction motor of the refrigerator compressor is driven by an inverter (variable voltage and variable frequency power source), generation of the motor loss which is the defect in the conventional inverter refrigerator control can be suppressed to the minimum by defining an optimum magnitude of the excitation current corresponding to the load torque and adequately controlling the motor efficiency.

As described above, according to the present invention, since the load torque follow-up control is effected based on the concept of optimizing the motor efficiency, the motor loss caused by a variation in the environmental condition can be reduced, the significant energy saving effect can be obtained and the service life of the motor used in the industrial machine can be made long in comparison with the case of the conventional inverter control (control with the V/f ratio kept constant).

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the application is not limited to a refrigerating machine and the present invention can also be applied to an induction motor used in other industrial machines.

What is claimed is:

1. An induction motor controlling device comprising:
   means for applying a preset primary voltage $V_{1(n)}$ to an induction motor;
   means for detecting a primary current $I_{1(n)}$ of the induction motor;
   means for deriving a torque factor parameter $u_{(n)}$ expressed by the following equation, $$u_{(n)} = \left\{ R_1 x_{m(n)} + \sqrt{(R_1 x^2_{m(n)} + D_{1(n)} \cdot D_{2(n)}} \right\} / D_{1(n)}$$

where $D_{1(n)} = (V_{1(n)}/I_{1(n)})^2 - (R_1^2 + x_{1(n)}^2)$ $D_{2(n)} = R_1^2 + (x_{1(n)} + x_{m(n)})^2 - (V_{1(n)}/I_{1(n)})^2$ $R_1$: the resistance of a primary winding,
$x_1$: primary leakage reactance ($x_1 = \omega l_{11}$, and $l_{11}$ is primary leakage equivalent inductance),
$x_m$: exciting reactance ($x_m = \omega l_{m1}$, and $l_{m1}$ is exciting leakage equivalent inductance), and
$\omega$: angular frequency;

means for deriving the magnitude $C_{(n)}$ of an excitation current expressed by the following equation, $$C_{(n)} = |I_{1(n)}|/\sqrt{1 + u^2_{(n)}}$$

means for deriving a target value $u^*_{(n)}$ of the torque factor parameter expressed by the following equation, $$u_{(n)}^* = R_1 x_{m(n)} / \left( \sqrt{R_1(R_1 + R_{21})x^2_{m(n)} + (R_1R_{21})^2} + R_1R_{21} \right)$$

where
$R_{21}$: the resistance of a secondary winding;
means for deriving the magnitude $C_{(n+1)}$ of an excitation current in the next cycle which maximizes the motor efficiency and is expressed by the following equation, $$C_{(n+1)} = C_{(n)} \sqrt{u_{(n)}/u_{(n)}^*} \; ; \text{and}$$

means for controlling the primary voltage to attain said excitation current $C_{(n+1)}$ according to the following equation, $$|v_{1(n+1)}| = C_{(n+1)}\sqrt{A(u^*)^2 + B(u^*)^2}$$

where $A(u^*) = R_1 - X_1 u^*.$ and $$B(u^*) = R_1 u^* + (x_1 + x_m).$$

2. A device according to claim 1, wherein said means for deriving the excitation current $C_{(n+1)}$ comprises:
   means for deriving a motor torque in the next cycle by use of a target value of the torque factor parameter and a load torque at the present time by use of a present value of the torque factor parameter; and
   means for deriving an excitation current in the next cycle by setting the motor torque in the next cycle to the load torque at the present time.

3. An induction motor controlling method comprising the following steps of:
   driving an induction motor by use of a certain value of primary voltage $V_{1(n)}$;
   detecting a primary current $I_{1(n)}$ and deriving a torque factor parameter $u_{(n)}$ by the following equation, $$u_{(n)} = \left( R_1 x_{m(n)} + \sqrt{(R_1 x_{m(n)}^2 + D_{1(n)} \cdot D_{2(n)}}\right) / D_{1(n)}$$

where $$D_{1(n)} = (V_{1(n)}/I_{1(n)})^2 - (R_1^2 + x_{1(n)}^2)$$

$$D_{2(n)} = R_1^2 + (x_{1(n)} + x_{m(n)})^2 - (V_{1(n)}/I_{1(n)})^2$$

$R_1$: the resistance of a primary winding,
$x_1$: primary leakage reactance ($x_1 = \omega l_{11}$, and $l_{11}$ is primary leakage equivalent inductance),
$x_m$: exciting reactance ($x_m = \omega l_{m1}$, and $l_{m1}$ is exciting leakage equivalent inductance), and deriving the magnitude $C_{(n)}$ of the present excitation current and a target value $u^*_{(n)}$ of the torque factor parameter which gives a maximum efficiency according to the following equations, $$C_{(n)} = |I_{1(n)}| / \sqrt{1 + u_{(n)}^2}$$

$$u_{(n)}^* = R_1 x_{m(n)} / \left(\sqrt{R_1(R_1 + R_{21})x_{m(n)}^2 + (R_1 R_{21})^2} + R_1 R_{21}\right)$$

where
$R_{21}$: the resistance of a secondary winding;
deriving the magnitude $C_{(n+1)}$ of an excitation current in the next cycle expressed by the following equation, $$C_{(n+1)} = C_{(n)} \sqrt{u_{(n)}/u_{(n)}^*} ; \text{ and}$$

controlling the primary voltage $V_{1(n+1)}$ to attain the excitation current $C_{(n+1)}$ according to the following equation, $$|V_{1(n+1)}| = C_{(n+1)} \sqrt{A(u^*)^2 + B(u^*)^2}$$

where $$A(u^*) = R_1 - X_1 u^*,$$

and $$B(u^*) = R_1 u^* + (x_1 + x_m).$$

4. A method according to claim 3, wherein said step of deriving the excitation current $C_{(n+1)}$ in the next cycle comprises the following substeps of:
   deriving a motor torque $T_{qm}(n+1)$ in the next cycle by use of the target value $u^*_{(n)}$ of the torque factor parameter and the present load torque $T_{qL(n)}$ by use of the present value of the torque factor parameter $u_{(n)}$ according to the following equations, $$T_{qL(n)} = 3Pl_{m1}C_{(n)}^2 u_{(n)}/2$$

$$T_{qm(n+1)} = 3Pl_{m1}C_{(n+1)}^2 u^*_{(n)}/2 = T_{qL(n)};$$

and deriving the magnitude of the excitation current in the next cycle according to the following equation by making the motor torque in the next cycle equal to the present load torque, $$3Pl_{m1}C_{(n+1)}^2 u^*(n)/2 = 3Pl_{m1}C_{(n)}^2 u_{(n)}/2$$

$$C_{(n+1)} = C_{(n)} \sqrt{u_{(n)}/u_{(n)}^*}.$$

5. An induction motor controlling device comprising:
   means for applying a preset primary voltage $V_{1(n)}$ to an induction motor;
   means for detecting a primary current $I_{1(n)}$ of the induction motor;
   means for deriving a torque factor parameter $u_{(n)}$ expressed by the following equation, $$u_{(n)} = \{R_1 x_{m(n)} + \sqrt{(R_1 x_{m(n)}^2 + D_{1(n)} \cdot D_{2(n)}}\}/D_{1(n)}$$

where $$D_{1(n)} = (V_{1(n)}/I_{1(n)})^2 - (R_1^2 + x_{1(n)}^2)$$

$$D_{2(n)} = R_1^2 + (x_{1(n)} + x_{m(n)})^2 - (V_{1(n)}/I_{1(n)})^2$$

$R$: the resistance of a primary winding,
$x_1$: primary leakage reactance ($x_1 = \omega l_{11}$, and $l_{11}$ is primary leakage equivalent inductance),
$x_m$: exciting reactance ($x_m = \omega l_{m1}$, and $l_{m1}$ is exciting leakage equivalent inductance), and
$\omega$: angular frequency;
means for deriving the magnitude $C_{(n)}$ of an excitation current expressed by the following equation, $$C_{(n)} = |I_{1(n)}| / \sqrt{1 + u_{(n)}^2}$$

means for deriving a target value $u^*_{(n)}$ of the torque factor parameter expressed by the following equation, $$u_{(n)}^* = R_1 x_{m(n)} / \left(\sqrt{R_1(R_1 + R_{21})x_{m(n)}^2 + (R_1 R_{21})^2} + R_1 R_{21}\right)$$

where $R_{21}$: the resistance of a secondary winding; and means for deriving the magnitude $C_{(n+1)}$ of an excitation current in the next cycle which maximizes the motor efficiency and is expressed by the following equation, $$C_{(n+1)} = C_{(n)} \sqrt{u_{(n)}/u_{(n)}^*}.$$

6. A device according to claim 5, wherein said means for deriving the excitation current $C_{(n+1)}$ comprises:

means for deriving a motor torque in the next cycle by use of a target value of the torque factor parameter and a load torque at the present time by use of a present value of the torque factor parameter; and means for deriving an excitation current in the next cycle by setting the motor torque in the next cycle to the load torque at the present time.

7. An induction motor controlling method comprising the following steps of:

driving an induction motor by use of a certain value of primary voltage $V_{1(n)}$;

detecting a primary current $I_{1(n)}$ and deriving a torque factor parameter $u_{(n)}$ by the following equation, $$u_{(n)} = \left( R_1 x_{m(n)} + \sqrt{(R_1 x_{m(n)}^2 + D_{1(n)} \cdot D_{2(n)})} \right) / D_{1(n)}$$

where $D_{1(n)} = (V_{1(n)}/I_{1(n)})^2 - (R_1^2 + x_{1(n)}^2)$ $D_{2(n)} = R_1^2 + (x_{1(n)} + x_{m(n)})^2 - (V_{1(n)}/I_{1(n)})^2$ $R_1$: the resistance of a primary winding, $x_1$: primary leakage reactance ($x_1 = \omega l_{11}$, and $l_{11}$ is primary leakage equivalent inductance), $x_m$: exciting reactance ($x_m = \omega l_{m1}$, and $l_{m1}$ is exciting leakage equivalent inductance), and deriving the magnitude $C_{(n)}$ of the present excitation current and a target value $u^*_{(n)}$ of the torque factor parameter which gives a maximum efficiency according to the following equations, $$C_{(n)} = |I_{1(n)}| / \sqrt{1 + u_{(n)}^2}$$

$$u_{(n)}^* = R_1 x_{m(n)} / \left( \sqrt{R_1(R_1 + R_{21})x_{m(n)}^2 + (R_1 R_{21})^2} + R_1 R_{21} \right)$$

where $R_{21}$: the resistance of a secondary winding; and deriving the magnitude $C_{(n+1)}$ of an excitation current in the next cycle expressed by the following equation, $$C(n+1) = C_{(n)} \sqrt{u_{(n)}/u_{(n)}^*}.$$

8. A method according to claim 7, wherein said step of deriving the excitation current $C_{(n+1)}$ in the next cycle comprises the following substeps of:

deriving a motor torque $Tqm(n+1)$ in the next cycle by use of the target value $u^*_{(n)}$ of the torque factor parameter and the present load torque $Tq_{L(n)}$ by use of the present value of the torque factor parameter $u_{(n)}$ according to the following equations, $Tq_{L(n)} = 3Pl_{m1}C_{(n)}^2 u_{(n)}/2$ $Tq_{m(n+1)} = 3Pl_{m1}C_{(n+1)}^2 u^*_{(n)}/2 = Tq_{L(n)}$;

and deriving the magnitude of the excitation current in the next cycle according to the following equation by making the motor torque in the next cycle equal to the present load torque, $$3Pl_{m1}C_{(n+1)}^2 u^*(n)/2 = 3Pl_{m1}C_{(n)}^2 u_{(n)}/2$$

$$C_{(n+1)} = C_{(n)} \sqrt{u_{(n)}/u_{(n)}^*}.$$

* * * * *

UNITED STATES PATENT AND TRADEMARK OFFICE
CERTIFICATE OF CORRECTION

PATENT NO. : 5,426,357

DATED : Jun. 20, 1995

INVENTOR(S) : Nobuyasu Satou

It is certified that error appears in the above-identified patent and that said Letters Patent is hereby corrected as shown below:

Title page, item [57],

IN THE ABSTRACT: Line 7, change "$.../I_{i(n)})^2...$" to --$.../I_{1(n)})^2...$--.

| Column | Line | |
|---|---|---|
| 1 | 19 | Change "voltage v" to --voltage V--. |
| 4 | 48 | Change "$u^* = R_1 x_m (...$" to --$u^* = R_1 x_m/(...$-- |
| 8 | 68 | After "$u^*$" change "." to --,--. |
| 10 | 28 | Change "$...u_{(n)}^*.$" to --$...u^*_{(n)}.$--. |

Signed and Sealed this

Tenth Day of October, 1995

Attest:

BRUCE LEHMAN

*Attesting Officer*  Commissioner of Patents and Trademarks